Feb. 10, 1931. O. R. WIKANDER 1,792,343
SPRING DEVICE
Filed Sept. 3, 1925
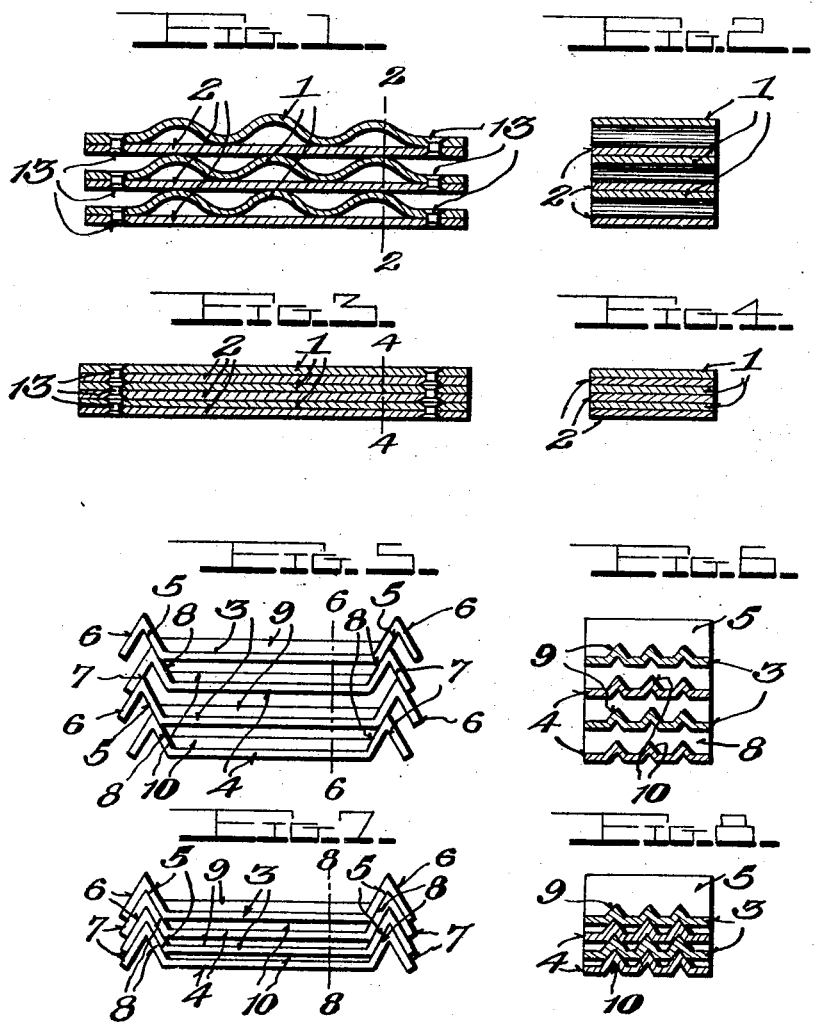
Inventor
Oscar R. Wikander;
By Paul E. Salling
Attorney Patented Feb. 10, 1931

1,792,343

UNITED STATES PATENT OFFICE

OSCAR R. WIKANDER, OF PITTSBURGH, PENNSYLVANIA

SPRING DEVICE

Application filed September 3, 1925. Serial No. 54,352.

This invention relates to a new type of spring which will operate mainly under tensional or compressive strains, as distinguished from the ordinary type of flexional and torsional springs. The types of springs known at present, and incorporating this feature, all consist of ring-shaped members in which the tensile and compressive strains follow circular lines. It is the object of the present invention to provide a durable and simply constructed spring in which the tensile and compressive stresses follow straight lines and in which the space requirements are reduced to a minimum.

The invention consists in the salient features of construction of strip-like members, and their novel arrangement and combination, as is more fully set forth in the following description and the appended claims, reference being made to the accompanying drawings wherein.

Figure 1 is a vertical, longitudinal section of the improved spring in its normal relaxed condition;

Fig. 2 is a transverse section thereof on line 2—2 of Fig. 1;

Fig. 3 is a view similar to Fig. 1 but with the spring fully compressed;

Fig. 4 is a transverse section thereof on line 4—4 of Fig. 3;

Fig. 5 is a modified form of the invention, depicting the spring in side elevation;

Fig. 6 is a transverse section thereof on line 6—6 of Fig. 5;

Fig. 7 is a view similar to Fig. 5, showing the spring compressed; and

Fig. 8 is a transverse section thereof on line 8—8 of Fig. 7.

Referring more in detail to the drawings, and particularly to Figs. 1 through 4, the numeral 1 designates corrugated compression strips underlying which are tension strips 2 which are joined at their ends by rivets 13. The spring is preferably composed of a series of such pairs of spring elements arranged in superposed relation. The compression strips or plates are normally flexed or corrugated intermediate their anchored ends and tend to separate from the flat tension plates or strips as depicted in Fig. 1, but when the spring is compressed the corrugations of the compression strips are flattened against the tension strips and the latter are distended or stretched so that both spring elements of a pair, when fully compressed, lie in flat contact with each other throughout.

In the embodiment of Figs. 5 through 8, the compression members 3 engage with the tensile members 4 along inclined surfaces, each strip or member terminating at its opposite ends in inverted V-shaped corrugations or channels providing ribs having oppositely inclined surfaces 5 and 6 on each end of the compression member, and similar but oppositely arranged inclined surfaces 7 and 8 on each end of the tension members. This arrangement and bearing contact of the several inclined surfaces is effected by shortening the distance between the ribs or channels of each tension member, so that the surfaces 5 and 7, which are interior of the channels contact with exterior surfaces 6 and 8, the coacting faces 6 and 7 being on the opposite side of the ribs to the coacting faces 5 and 8. The body portion of each strip 3, 4, is reinforced between the ribs by longitudinal corrugations 9 and 10, respectively.

From Fig. 7 it will be noted that in their compressed condition the strips 3 become contracted and the strips 4 extended to effect a nesting of the two so that the several spring elements assume or approach the same shape except for a possible difference in thickness, when the spring device is fully compressed.

In assembling the several elements, the ultimate force of this spring can be made two, three or more times larger and the travel of the spring reduced to one-half, one-third or a smaller fraction, simply by using groups of two, three or more tensile strips alternating with groups of two, three or more compression strips.

What is claimed is:

1. A spring device consisting of adjacent tension and compression members, and means whereby tensile and compression stresses are produced in said members in a direction perpendicular to the travel of the spring device, the surfaces of the fully expanded tension members registering with those of the fully compressed compression members.

2. A spring device, according to claim 1, in which the compression members consist of corrugated strips and the tensile members consist of straight strips, the ends of pairs of adjacent members being joined together.

3. A spring device, according to claim 1, in which the tension and compression members have coacting inclined surfaces so arranged that the tension members will be stretched and the compression members will be compressed during the travel of the spring device.

4. A spring device according to claim 1 consisting of a group of tension and compression devices, each comprising a compression member and a tension member, permanently connected, and means whereby tensile and compression stresses are produced in said groups of members in a direction perpendicular to the travel of the spring device, the surfaces of the fully expanded tension members registering with those of the fully compressed compression members.

5. A spring device according to claim 1 comprising alternately arranged tension and compression members, the former comprising a flat strip and the latter consisting of a corrugated strip secured at the opposite ends to the respective tension member.

6. A spring device according to claim 1 comprising alternately arranged sets of tension and compression members, each set comprising a tension strip and a compression member strip, said strips being permanently joined, at least one of the strips having lateral deflections adapted to be more or less straightened out under compression of said strip.

7. A spring device comprising a working couple of a tension strip and a compression strip lying in parallel planes when the spring is fully compressed and terminally engaged with each other, one strip being linearly expansible and contractible in a straight line and the other strip having portions laterally deflected from its plane and adapted to straighten out under compression and thereby impart linear expansion to the first-named strip.

8. A spring device according to claim 1, wherein the tension and compression members are provided with corrugated surfaces, the corrugations being spaced farther apart on the compression members, when the spring device is in its expanded condition, the corrugations of adjacent tension and compression members registering when the spring is fully compressed.

In testimony whereof I affix my signature.

OSCAR R. WIKANDER.